B. W. DAVID.
GENERATOR.
APPLICATION FILED MAR. 20, 1915.
1,295,278.
Patented Feb. 25, 1919.
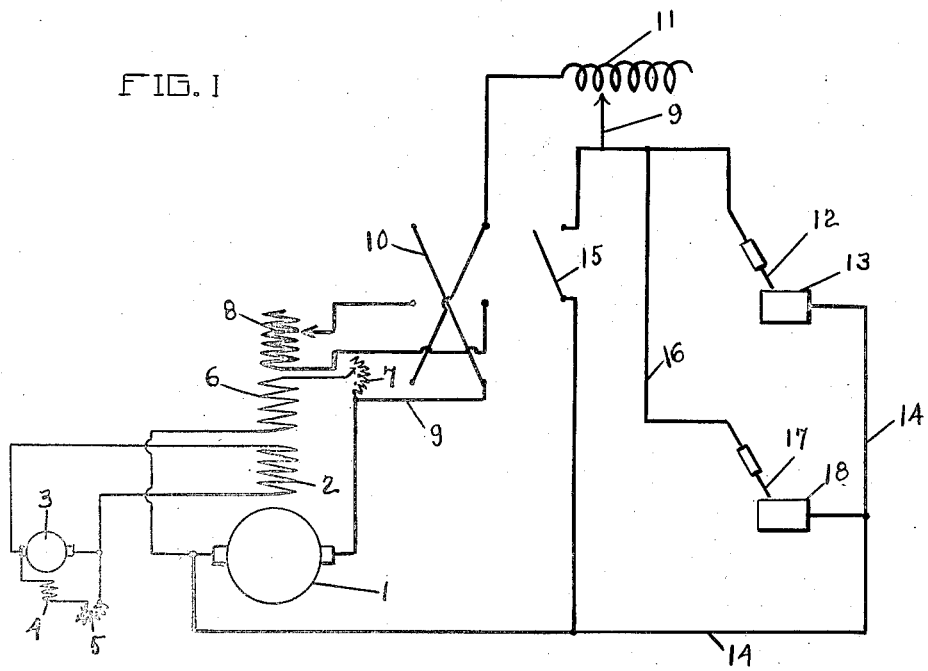
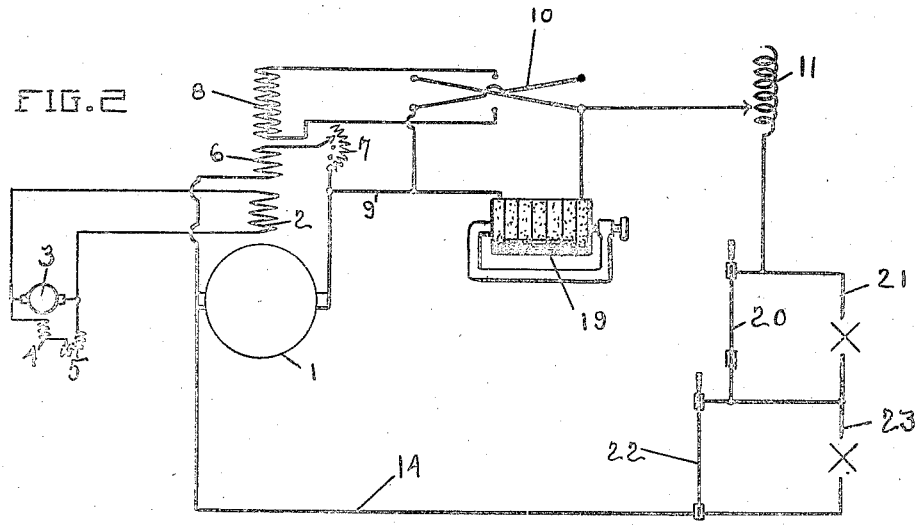

UNITED STATES PATENT OFFICE.

BRUCE W. DAVID, OF CLEVELAND, OHIO, ASSIGNOR TO THE LINCOLN ELECTRIC COMPANY, OF CLEVELAND, OHIO, A CORPORATION OF OHIO.

GENERATOR.

1,295,278.      Specification of Letters Patent.      Patented Feb. 25, 1919.

Application filed March 20, 1915. Serial No. 15,842.

*To all whom it may concern:*

Be it known that I, BRUCE W. DAVID, a citizen of the United States, residing at Cleveland, Cuyahoga county, Ohio, have invented new and useful Generators, of which the following is a specification.

This invention relates to mechanisms for controlling power consumption, particularly in connection with electric circuits.

This invention has utility when incorporated in connection with dynamo electric machines, especially electric generators for handling variable current demands economically, as the taking care of a plurality of arcs automatically independent of the interposition of non-working or merely loading resistance in the circuit.

Figure 1 is a wiring diagram of an embodiment of the invention, the showing being of an electric generator to supply current for a plurality of arcs, say for welding; and Fig. 2 is a wiring diagram, also of an electric generator for arcs, say for moving picture or picture projection purposes.

The generator 1 or dynamo electric machine is provided with the independently excited field winding 2 supplied by the exciter generator 3 having the shunt winding 4 with the rheostat 5 therein adjustable to vary the exciter current and thus control the strength of the field 2.

Supplementing this separately excited field winding 2, is the shunt field winding 6, which may be adjustable through the rheostat 7 to vary its action as to the current generated by the generator 1.

In addition to these two independent or different circuit field windings 2, 6, there is the third, still different and independent circuit field winding 8. This field winding 8 is in series with the main circuit of the generator 1. In the main circuit 9 from the generator 1 may be the reversing switch 10 to reverse the series field winding 8, say from supplementing the field windings 2, 6, to differential relation thereto.

Also in series in the main circuit 9 is the reactance 11, tending to dampen any sudden fluctuation in current demand and retard responsiveness thereto at the generator.

As a working load for the main circuit there may be the electrode 12 adjustable to form an arc with the work 13 in completing circuit to the generator 1 through the line 14 when the switch 15 is open. A second arc is shown from the line 16. This second arc has the electrode 17 adjustable as to the work 18 to draw an arc for circuit through the line 14 when the switch 15 is open.

This structure has utility in picture projection, say in changing from one reel to another or from still to moving pictures, the normal running being with a single arc. This apparatus, without the use of load resistance, will readily care for the two arcs in its regular generation, thus economically and automatically responding to this extreme condition. This end is attained through the generator and its plurality of field windings.

The multiple field windings introduce independent features of adjustment and automatic control.

Considering the shunt field winding 6 as in operation developing an ascending curve for the field poles laid out on voltage ordinates and ampere turns abscissæ, this curve has a general ascending line as to these potential and current elements up to a bend or knee, where approaching saturation of the poles shows the increase in ampere turns giving proportionately less rate of increase of generated volts. By imposing upon, or rather supplementing the shunt field winding 6 with a separately excited field winding, the no load generated volts may be moved up along the knee. In addition to the shunt and separately excited windings 6, 2, opposing or counteracting ampere turns may be introduced by the "bucking" or differential field winding 8. The winding 6 is designed to have its resistance approximate in direction the straight line below the knee portion of the magnetization curve.

In Fig. 2 there is shown the compressible carbon pile 19 in shunt with the field winding 8, and this adjustment may be operable to vary the action of the generator, as well as the rheostats in the control of the other windings, or in lieu of the direct adjustment of this series field 8 disclosed in Fig. 1.

The arcs in Fig. 2 are shown in series. With the switch 20 open, current may flow through the arc 21 which may be drawn to the proper position, while with the switch 22 open, the arc 23 in series with the arc 21 may be drawn to position.

In practice, say for the conditions advanced herein, it has been found desirable to add the separately excited field winding 2 to develop a generated volts curve as to ampere turns in the generator 1 practically parallel with the straight ascending portion of the shunt field winding 6 curve below the knee thereof. Owing to these factors varying in the generator operation, the shunt curve of generated volts and ampere turns is followed with the no load point farther up along the knee of the curve. When load is applied, as one or two arcs, the voltage drops but the fields interact to keep current flow constant.

What is claimed and it is desired to secure by Letters Patent is:

1. A circuit subject to wide changes in resistance, a reactance to retard current changes, and a generator for said circuit embodying a field magnet, self and separately excited shunt windings for the generator, said self-excited shunt winding at all times being maintained as a self-excited shunt, the volt ampere turn characteristic of the self-excited shunt winding corresponding to the magnetization curve of the magnet.

2. A circuit subject to wide changes in resistance, a reactance to retard current changes, and a generator for said circuit embodying a field magnet, a series field winding for the generator and self and separately excited shunt windings for the generator, said self-excited shunt winding at all times being maintained as a self-excited shunt, the volt ampere turn characteristic of the self-excited shunt winding corresponding to the magnetization curve of the magnet.

In testimony whereof I affix my signature in the presence of two witnesses.

BRUCE W. DAVID.

Witnesses:
J. W. MERIAM,
A. F. DAVIS.